June 25, 1940. C. C. SCHARPENBERG 2,205,697
TOOL JOINT FOR WELL DRILLING
Filed May 6, 1938
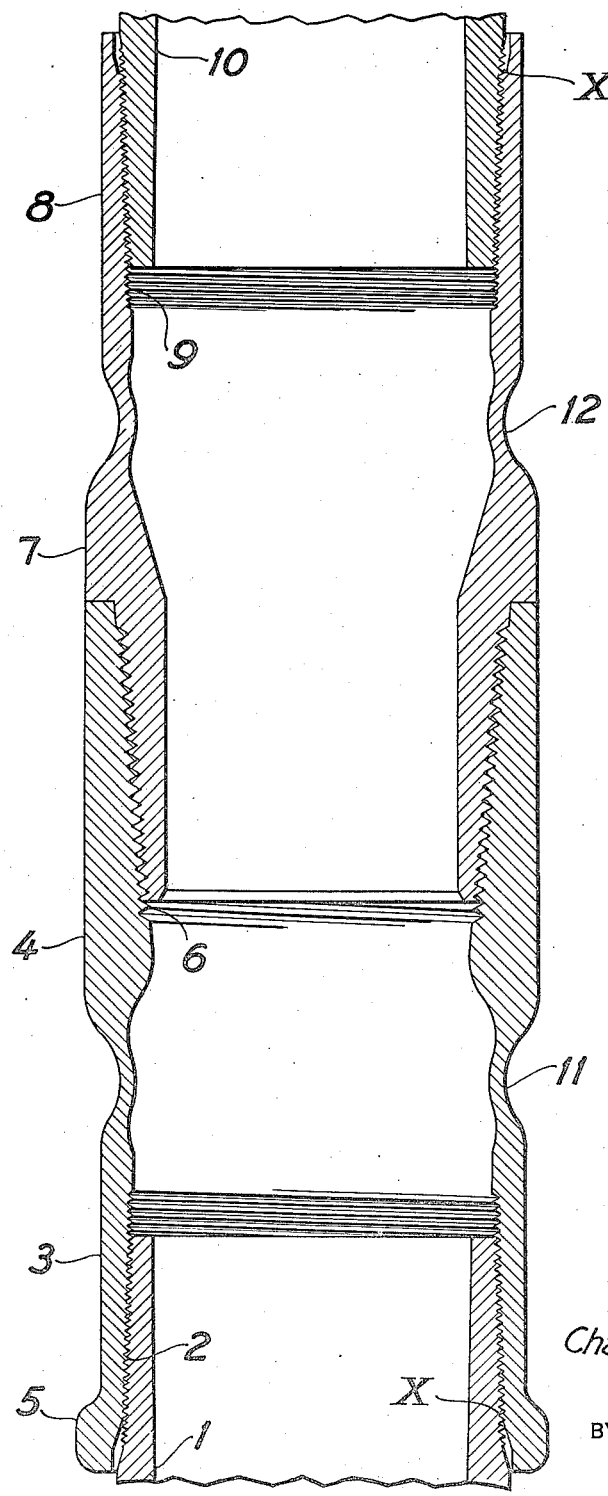
Charles C. Scharpenberg
INVENTOR
BY
ATTORNEY Patented June 25, 1940

2,205,697

UNITED STATES PATENT OFFICE 2,205,697

TOOL JOINT FOR WELL DRILLING

Charles C. Scharpenberg, Bakersfield, Calif.

Application May 6, 1938, Serial No. 206,408

2 Claims. (Cl. 285—146)

This invention relates to tool joints or couplings such as are used to join lengths of pipe for drilling deep wells, and particularly refers to an improved form of tool joint which will be lighter and more flexible than those heretofore employed and which will reduce stresses and failures in the pipe sections between which it is placed.

In the design and arrangement of tool joints for well drilling it has heretofore been considered necessary to make them as thick and heavy as possible, consistent with the space requirements in which they were to be used and consistent with the provision of an axial bore through which drilling fluid could be passed. This has been especially true of the shank between the pin and box threads adapted to join the two parts of the coupling and the collars in which were the female threads which joined the coupling parts to the drill pipe.

Since well drilling loads are very severe, it is desirable to have drill pipe strings with joints at least as strong as the rest of the pipe. In an attempt to do this the conventional drill pipe is generally reinforced or upset at its threaded ends by an increased wall thickness to offset the weakening effect of the threads. In spite of this reinforcement, failure of the drill pipe in the neighborhood of the last thread on the pipe frequently occurs. This detrimental effect or influence of the tool joint can be attributed primarily to its rigidity being greater than that of the pipe, as will be discussed below.

This type of failure indicates that the stresses in the drill pipe adjacent to the tool joint during drilling operations are higher than in other parts of the pipe and are sufficient to develop fatigue failure when imposed many times and under the influence of corrosive fluids. These destructive stresses are chiefly tensional stresses due to the weight of pipe and drill bit or tool and to longitudinal vibration; torsional stresses due to the rotational resistance of the tool and to torsional vibration; and bending stresses due to the bending of drill pipe in crooked well bores. All cooperate to develop fatigue failure, particularly at the last engaged thread of the pipe with the tool joint collar.

This invention broadly comprehends the reduction of these stresses in the drill pipe by a modification in the construction and proportions of the couplings or tool joints connecting adjacent lengths of the pipe. By these changes, which will be discussed in detail below, the stresses at the root of the threads in the pipe are reduced so that a substantial increase in fatigue resistance is obtained.

Other objects and advantages are a substantial reduction in weight of tool joints and consequent decrease in load on the drill pipe, reduction in vibration of drill pipe due to lighter tool joints, reduction of the momentum effect when the tool joint is rotating out of balance, as in a large diameter or crooked hole, decrease in wear on the tool joint and casing, and other advantages which will be recognized by those skilled in the art, and will be further apparent from the following description and the accompanying drawing which forms a part of this specification and illustrates a tool joint embodying a preferred form of the invention.

In a drill pipe string, the drilling forces must be transferred from one pipe length to the next across the threaded joints. When transferring a force from a steel pipe to a threaded steel collar, deformation of both parts takes place. If the wall thickness of the pipe is the same as that of the collar, their deformations will be similar. If, on the other hand, the thickness of the pipe is greater than that of the collar, the deformation of the pipe at the last engaged threads will be less than that of the corresponding part of the collar. Now, since stress is proportional to strain (unit deformation) in the working range of useful steel (under the elastic limit), the stress in the pipe will also be less than the stress in the collar.

It follows, therefore, that the last-engaged-thread stresses in a thin collar will be high while those in the pipe will be low. Also, it follows, that conversely a thick collar gives a low collar stress and a high pipe stress. This condition is true regardless of the nature of the forces; that is, the principle is the same whether the forces are a combination of torsional, bending and tensional forces or are simple tensional forces.

Accordingly, to practice this invention the collars of the tool joint into which the drill pipe is threaded are made thinner than the drill pipe wall at its threaded portion. This reduces the stresses in the pipe where failure commonly takes place, and raises the stresses in the collars. To take care of the higher stresses in the collars they are preferably made of a high strength steel, for example an S. A. E. 4140 alloy, heat treated to give an ultimate strength of 140,000 lbs. per sq. in. and a yield point of 115,000 lbs. per sq. in., which affords ample fatigue resistance and yet does not alter the stress-strain relation discussed above, because all steel has approximately the same modulus of elasticity. Further development of the computations for the collar thickness is given below.

In addition to making the collars thinner, the shank or intermediate portion of both the pin and box sections of the tool joint is preferably reduced and shaped as a groove to increase the deflection at this point. Here again the distortion is accompanied by an increase in stress and is taken care of by the stronger steel. However, the purpose of increasing the distortion at these points is to decrease the bending forces in the vulnerable part of the pipe. No change in the torsional or tensional stresses in the pipe will result because the total forces remain the same and no change in the distribution of the forces across the pipe threads occurs. With the bending forces, however, the increased flexibility of the shanks allows them to deflect more readily and affords a relief which reduces the bending forces at the threaded joints. The essential requirements of the new shape at the shanks are: first, smooth or recurved surfaces and gradually changing thicknesses so that overstressing caused by the presence of sharp corners and notches will be avoided; and second, moderate curvature similar to that shown in the drawing so that some flexibility is obtained without excessive stress.

Referring to the drawing, reference numeral 1 designates the upset or thickened end of a section of drill pipe, provided with tapered threads 2, which engage similarly tapered threads inside the collar 3 of a box section 4 of a tubular tool joint sleeve coupling. The bottom of collar 3 may be radially thickened or flanged as at 5 or a ring secured to pipe 1 below the threads 2 to provide an adequate bearing for the elevator used to run the drill pipe into and out of a well bore. This latter provision is desirable because of the customary position of the box section at the upper end of drill pipe to facilitate coupling the two parts.

Box section 4 of the tool joint sleeve is provided with the usual tapered threaded bore 6, to receive the correspondingly threaded tubular pin member 7, the shape and arrangement of these threads and the wall thickness at this point being substantially that of the American Petroleum Institute or any similar standard. Pin member 7 is likewise provided with a collar 8, threaded at 9 to receive the correspondingly threaded upset end 10 of a second section of drill pipe.

It will be noted that collars 3 and 8 of the joint are thinner than the upset or reinforced ends 2 and 10 of the drill pipe sections, and this thickness may readily be determined for any given set of conditions by computation along the lines of the following example:

Assume 6⅝" full hole tool joint for grade "D" drill pipe
Ultimate strength of pipe, 100,000 lbs. per sq. in.
Ultimate strength of tool joint, 140,000 lbs. per sq. in.
Cross-sectional area of metal at last engaged pipe thread (designated X on drawing), 11 sq. in.

Since the endurance limit of these steels under repeated cycles of flexure bears an approximately constant relation to their ultimate strengths (about 50% of ultimate) and the notch and corrosion factors for the pipe thread are approximately the same as those for the collar thread, uniform fatigue strength would approximately exist when the pipe and collar cross-sectional areas at their threads were inversely proportional to their ultimate strengths. That is, if the cross-sectional area of the pipe 10 at point X is 11 sq. in. then the corresponding cross-sectional area of the collar 8 to give uniform strength would be $$\frac{100,000}{140,000} \times 11 = 7.86 \text{ sq. in.}$$

This area, for the example given, corresponds to an outside diameter of collar 8 of 7.05 inches.

It is ordinarily advisable to add a small constant amount to this computed value, since an imperfection of a given size in each piece would affect the strength of the thinner collar section to a greater extent than that of the thicker pipe section.

It will be noted that the shanks 11 and 12 intermediate the box section 4 and collar 3, and pin section 7 and collar 8, are not only reduced in thickness below the usual design of tool joint but are also thinner than the collars 3 and 8 just discussed, to provide flexibility that will relieve the drill pipe of bending stresses at the threaded joints. The outside and inside diameters of the reduced sections 11 and 12 are preferably those of the wall of the drill pipe intermediate the reinforced or upset ends, and these are preferably arrived at by long smooth curves, grooves or recurved shapes as shown, avoiding sharp or sudden changes at section that will concentrate stresses and provide points at which fatigue failures may start.

It is obvious that the specific materials and proportions described in the example given, and the particular form of curves in the drawing may be modified depending on sizes of tool joints, whether or not they are of the full hole type illustrated, and on the size and arrangement of the reinforcing or lack of it on the drill pipe sections that are to be joined. Consequently, these specific data are to be considered illustrative and not limiting, and all such modifications of them that are within the scope of the appended claims are embraced thereby.

I claim:

1. Means for coupling adjacent ends of drill pipe sections, comprising a sleeve having ends for connection with the ends of the drill pipes, said sleeve having intermediate its ends a relatively narrow zone of reduced thickness formed by providing a groove in its outer face with the side walls of the groove gradually increasing in thickness to the full thickness of the sleeve to avoid sharp corners and notches, said zone of reduced thickness providing said sleeve with a flexibility substantially equal to the flexibility of the pipes which it couples.

2. Means for coupling adjacent ends of drill pipe sections, comprising a pin section and a box section, means for separably connecting said sections together at their inner ends, each of said pin and box sections having intermediate its ends a relatively narrow zone of reduced thickness formed by providing a groove in its outer face with the side walls of the groove gradually increasing in thickness to the full thickness of the section to avoid sharp corners and notches, said zones of reduced thickness providing said connected sections with a flexibility substantially equal to the flexibility of the pipes coupled thereby.

CHARLES C. SCHARPENBERG.